(12) United States Patent
Li

(10) Patent No.: US 11,674,636 B1
(45) Date of Patent: Jun. 13, 2023

(54) SUPPORT FRAME WITH CLAMPING ADJUSTMENT FUNCTION

(71) Applicant: Chin-Chu Li, Taichung (TW)

(72) Inventor: Chin-Chu Li, Taichung (TW)

( * ) Notice: Subject to any disclaimer, the term of this patent is extended or adjusted under 35 U.S.C. 154(b) by 0 days.

(21) Appl. No.: 17/829,287

(22) Filed: May 31, 2022

(51) Int. Cl.
*F16M 13/00* (2006.01)
*F16M 13/02* (2006.01)
*F16B 2/06* (2006.01)

(52) U.S. Cl.
CPC .......... *F16M 13/022* (2013.01); *F16B 2/065* (2013.01); *F16M 2200/06* (2013.01)

(58) Field of Classification Search
CPC .. F16M 13/022; F16M 2200/06; F16B 2/065; F16B 2/22
See application file for complete search history.

(56) References Cited

U.S. PATENT DOCUMENTS

| | | | | |
|---|---|---|---|---|
| 5,867,132 A * | 2/1999 | Blasing | ................... | H01Q 1/125 343/890 |
| 5,964,439 A * | 10/1999 | Johnson | ................... | A61G 5/10 248/278.1 |
| 6,262,691 B1 * | 7/2001 | Austin | ................... | H01Q 1/1228 343/890 |
| 7,404,532 B1 * | 7/2008 | Baril | .................. | E06B 9/04 256/73 |
| D750,475 S * | 3/2016 | Bucher | ................... | F16M 11/16 D8/382 |
| 9,695,976 B2 * | 7/2017 | Hill | .......................... | F16B 43/02 |
| 10,260,538 B2 * | 4/2019 | Keller | ........................ | F16B 2/06 |
| 11,592,141 B2 * | 2/2023 | Brandt | .................. | F16M 11/105 |
| 2010/0288897 A1 * | 11/2010 | Chang | ........................ | G09F 7/18 248/229.2 |
| 2015/0136920 A1 * | 5/2015 | Hemmervall | ........ | F16B 5/0233 248/201 |
| 2016/0294036 A1 * | 10/2016 | Christie | .................... | H01Q 3/06 |
| 2016/0312951 A1 * | 10/2016 | Zhai | ........................ | F16M 11/16 |
| 2018/0159201 A1 * | 6/2018 | Woodling | ................ | H01Q 3/04 |
| 2020/0261294 A1 * | 8/2020 | Lao | ........................ | F16M 11/08 |
| 2022/0029270 A1 * | 1/2022 | Yoo | ........................ | F16B 2/065 |
| 2023/0054447 A1 * | 2/2023 | Evitt | ....................... | F16B 2/185 |

* cited by examiner

*Primary Examiner* — Amy J. Sterling
(74) *Attorney, Agent, or Firm* — Chun-Ming Shih; HDLS IPR Services

(57) ABSTRACT

A support frame for clamping a rod includes two gripping assemblies. The gripping assembly includes a seat, two gripping blocks, two connecting members, a first adjusting screw and a second adjusting screw. The seat has a first through hole. The gripping block is slidably connected to the seat and has a hole body, a gripping notch and a long trough corresponding to the first through hole. The connecting member is disposed on the gripping block and has a first threaded hole corresponding to the first through hole. The first adjusting screw passes through the first through hole and the long trough to screw to the first threaded hole. A gripping recess is formed between the gripping notches of the gripping blocks. The two gripping assemblies jointly grip the rod by the gripping recesses. The second adjusting screw passes through and screws to the hole bodes of the gripping assemblies.

11 Claims, 6 Drawing Sheets

SUPPORT FRAME WITH CLAMPING ADJUSTMENT FUNCTION

BACKGROUND

Technical Field

The disclosure relates to a support frame of an electronic product, particularly to a support frame with a clamping adjustment function.

Description of Related Art

A support frame is used for supporting various electronic products, especially electronic products with display panels.

An electronic product is fixed to an end of a support frame (with a bendable arm assembly), a fixing portion of the other end thereof is fixed to a rod, so as to fasten the electronic product to the rod through the support frame.

A related-art support frame can be fastened to a rod, but the rod may have different sizes in different using circumstances or requirements. Under the condition of being unable to adjust the fixing portion in a related-art support frame, the fixing portion must be exclusively made with a specific size corresponding to every single rod size. This results in the necessity to select a corresponding fixing portion to fix the support frame to a rod. It is troublesome and inconvenient and should be solved.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

An object of the disclosure is to provide a support frame with a clamping adjustment function, which utilizes the adjustable gripper to fit rods with different sizes.

To accomplish the above object, the disclosure provides a support frame with a clamping adjustment function for clamping a rod, which includes: an adjustable gripper, including a pair of gripping assemblies for gripping the rod, and each gripping assembly including:

a seat, disposed with multiple first through holes;

a pair of gripping blocks, slidably connected to the seat, each gripping block including a hole body and a gripping notch, and each gripping block disposed with a long trough corresponding to the first through hole;

a pair of connecting members, separately disposed on the pair of gripping blocks, and each connecting member disposed with a first threaded hole corresponding to the first through hole;

a pair of first adjusting screws, each first adjusting screw passing through both the first through hole and the long trough to screw to the first threaded hole, and the gripping assembly jointly formed with a gripping recess between the gripping notches of the pair of gripping blocks; and a pair of second adjusting screws;

wherein the pair of gripping assemblies jointly grips the rod with the gripping recesses, and each second adjusting screw passes through the hole body of one of the gripping assemblies to screw to the hole body of another one of the gripping assemblies.

In comparison with the related art, the disclosure has the following functions: utilizing the gripping adjustment function of the adjustable gripper to fit a rod with any size, and having high gripping stability without loosening.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
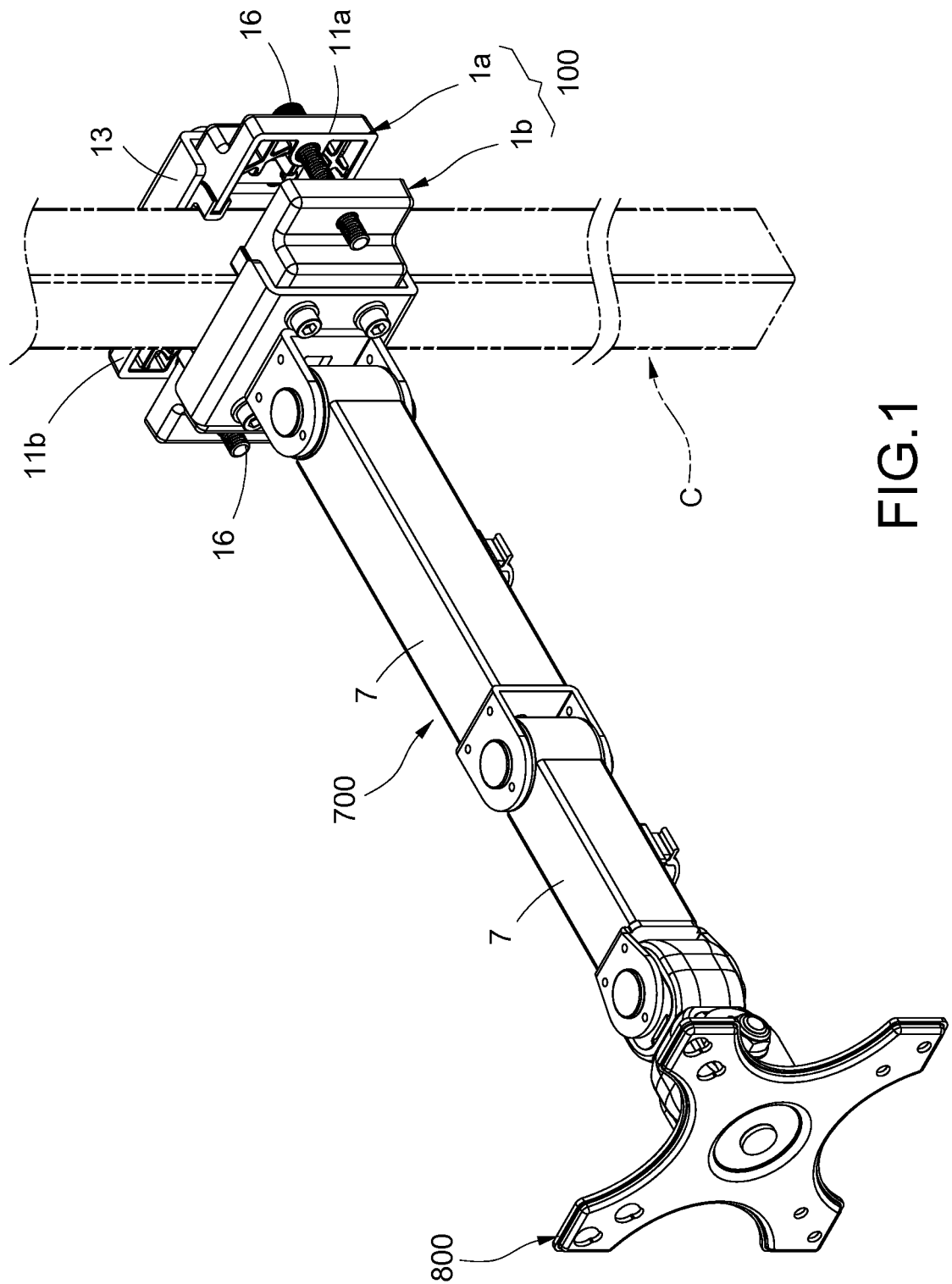
FIG. 1 is a perspective view of the support frame of the disclosure gripping a rod.
Figure 6:
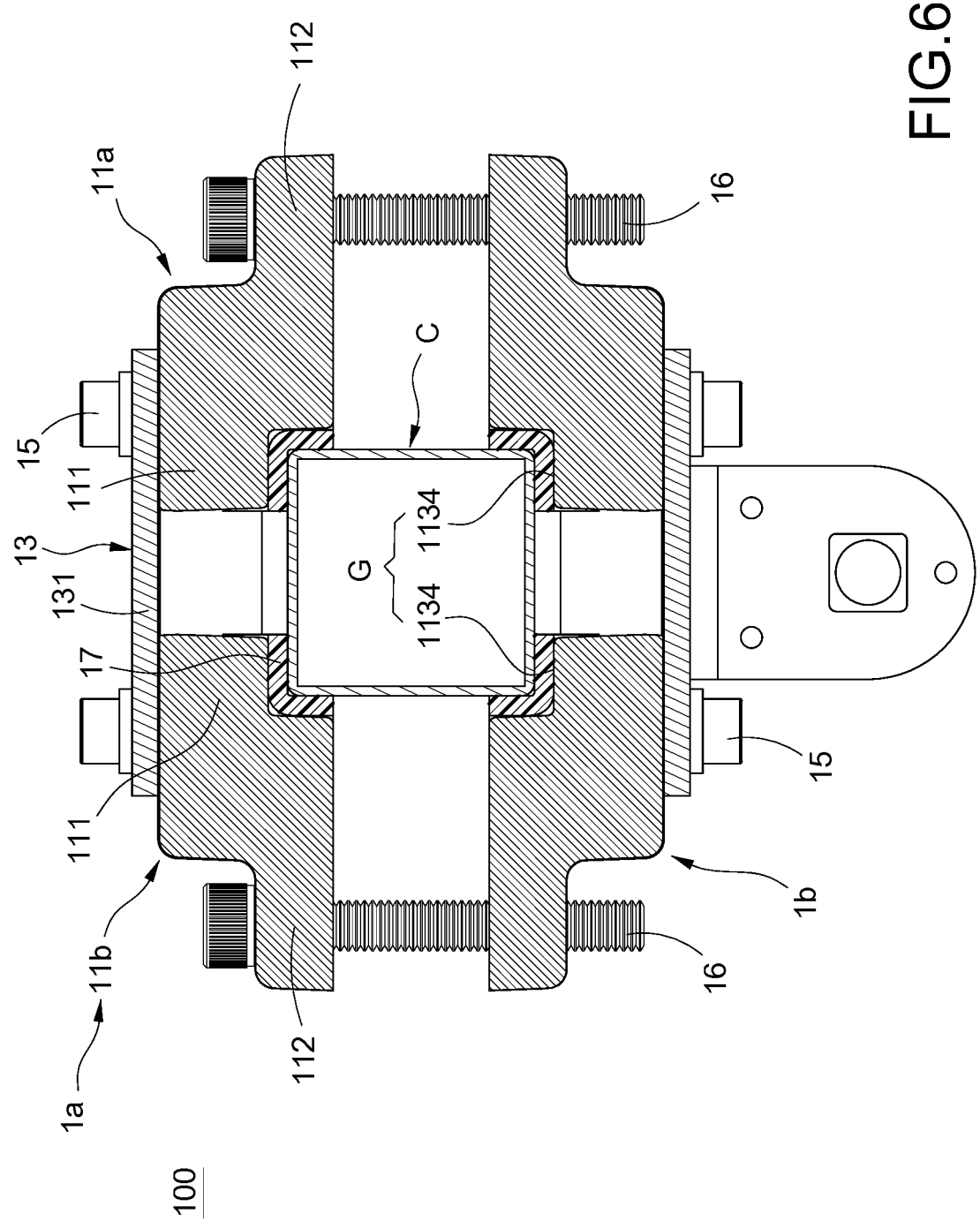
FIG. 6 is a cross-sectional view along line 6-6 in FIG. 4.

The disclosure provides a support frame with a clamping adjustment function for clamping a rod C, as shown in FIG. 1, to support an electronic product (not shown in figures) fixed on a carrier plate 800. Also, the electronic product may be moved to a required position by using a bendable support arm assembly 700. The rod C is a rectangular rod with a length size and a width size as shown in FIG. 6 but not labeled.

Figure 2:
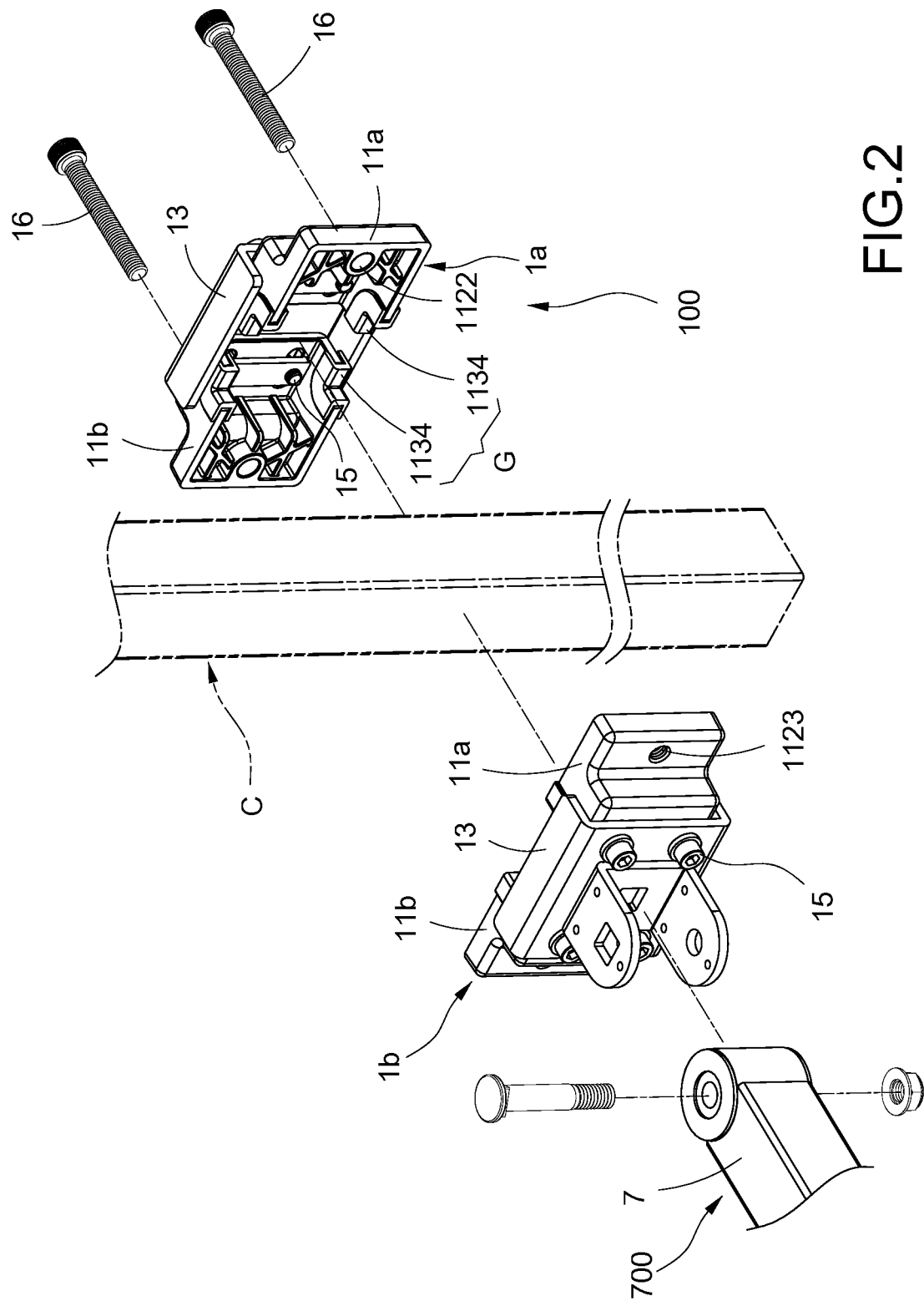
FIG. 2 is an exploded view of the adjustable gripper of the disclosure before gripping a rod.

As shown in FIGS. 1 and 2, the support frame with a clamping adjustment function (hereinafter "support frame") of the disclosure includes an adjustable gripper 100, the support arm assembly 700 and the carrier plate 800. The carrier plate 800 is used for fixing the electronic product. The support arm assembly 700 includes multiple (at least two) support arms 7 connected in series, and two support arms 7 are bendably connected. Two ends of the support arm assembly 700 are bendably connected to the adjustable gripper 100 and the carrier plate 800.

Please refer to FIGS. 1-4. The adjustable gripper 100 includes a first gripping assembly 1a and a second gripping assembly 1b. The first gripping assembly 1a and the second gripping assembly 1b are used for gripping the rod C. The first gripping assembly 1a and the second gripping assembly 1b are the same in structure, the difference is the hole body on gripping blocks 11a, 11b of the first gripping assembly 1a is the second through hole 1122 as shown in FIG. 2 and the hole body on gripping blocks 11a, 11b of the second gripping assembly 1b is the second threaded hole 1123 as shown in FIG. 2. Thus, only the first gripping assembly 1a is described hereinafter as an example.

The first gripping assembly 1a includes a first gripping block 11a, a second gripping block 11b, a seat 13, a pair of connecting members 18, a pair of first adjusting screws 15 and a pair of second adjusting screws 16. In some embodiments, the disclosure further includes multiple bushings 17.

The structure of the seat 13 is not limited to the disclosure, all those which can provide the first and second gripping blocks 11a, 11b to slide are available. In the embodiment, the seat 13 including a seat plate 131 and two wall plates 132 is described as an example. The seat plate 131 has two edges (not labeled in figures) opposite to each other. The two wall plates 132 are upright connected to the two edges of the seat plate 131 to jointly form a sliding trench 133 between the seat plate 131 and the two wall plates 132. The seat plate 131 is formed with multiple first through holes 1311.

The first gripping block 11a and the second gripping block 11b are slidably and parallelly connected in the sliding trench 133 of the seat 13 to make the first gripping block 11a and the second gripping block 11b be able to slide toward or away from each other, so that their distance is adjusted.

Figure 3:
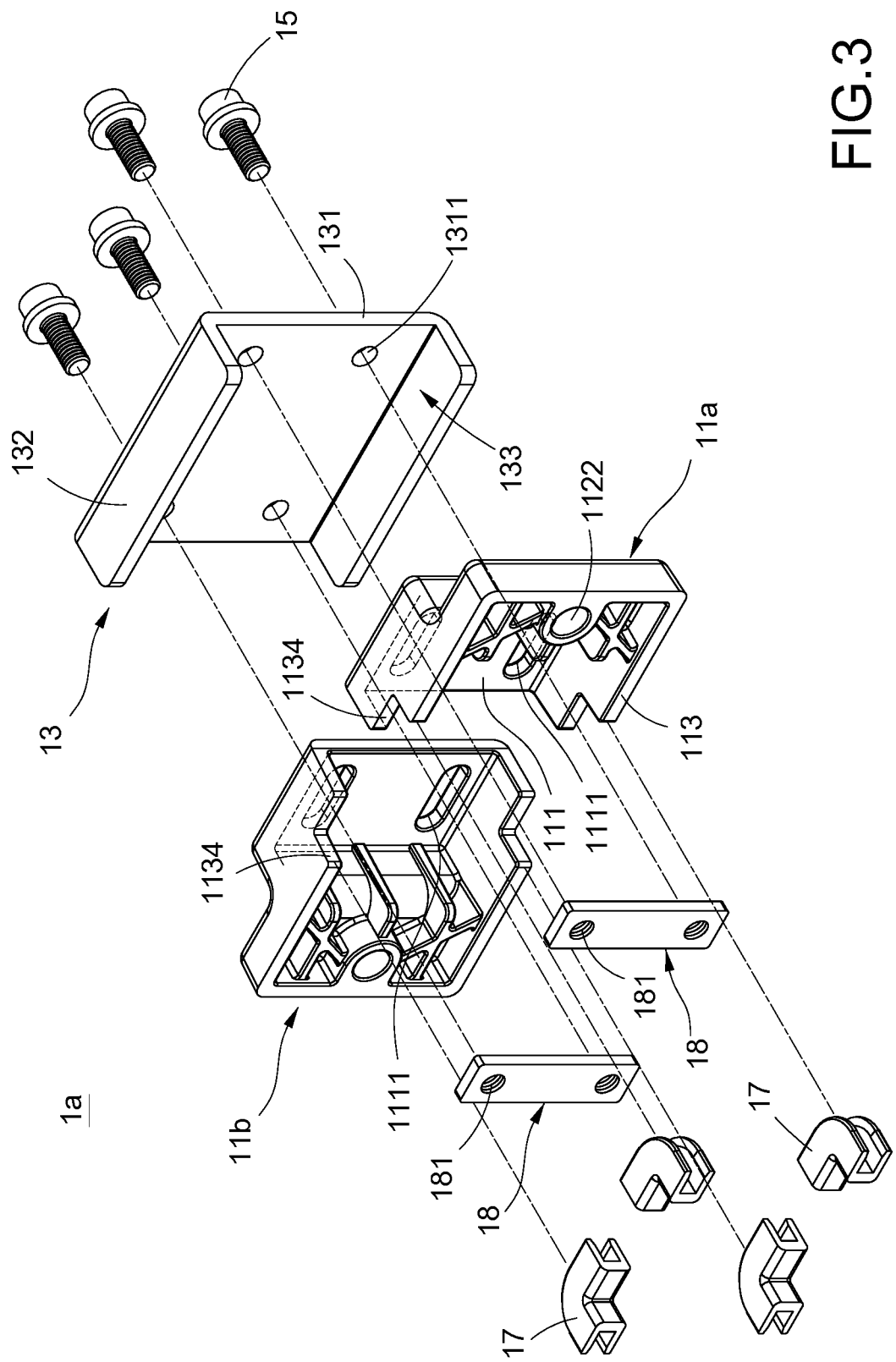
FIG. 3 is an exploded view of the first gripping assemblies in FIG. 2.

The first gripping block 11a and the second gripping block 11b are the same in structure, so only the first gripping block 11a is described hereinafter. As shown in FIGS. 1, 3 and 6, the first gripping block 11a includes a step and a surrounding plate 113. The surrounding plate 113 surrounds and is connected to the edge (or contour) connected to the step. The step includes a first stair 111 and a second stair 112, which are connected in a step manner.

The first stair 111 is formed with at least one long trough 1111. The second stair 112 is formed with the hole body (namely, the second through hole 1122). It is noted that the hole body in the first gripping block 11a of the second gripping assembly 1b is the second threaded hole 1123. The surrounding plate 113 is formed with at least one gripping notch 1134 with an indent shape.

The two connecting members 18 are separately disposed on the first gripping block 11a and the second gripping block 11b. The connecting member 18 is disposed with at least one first threaded hole 181. The connecting member 18 may be a two-piece structure (not shown in figures) or a one-piece structure as shown in FIG. 3 (the connecting member 18 in FIG. 3 is a plate). The two-piece structure may be two screws or the like.

When assembling, the first gripping block 11a and the second gripping block 11b are slidably and parallelly connected in the sliding trench 133 of the seat 13, and the two connecting members 18 are separately disposed on the first gripping block 11a and the second gripping block 11b to make each first threaded hole 181 correspondingly communicate with each first through hole 1311 via each long trough 1111 and make both the gripping notch 1134 of the first gripping block 11a and the gripping notch 1134 of the second gripping block 11b jointly form a gripping recess G as shown in FIG. 6. Each first adjusting screw 15 passes through each first through hole 1311 and each long trough 1111 to loosely screw to each first threaded hole 181 temporarily so that both the first gripping block 11a and the second gripping block 11b may slide against the seat 13.

Figure 4:
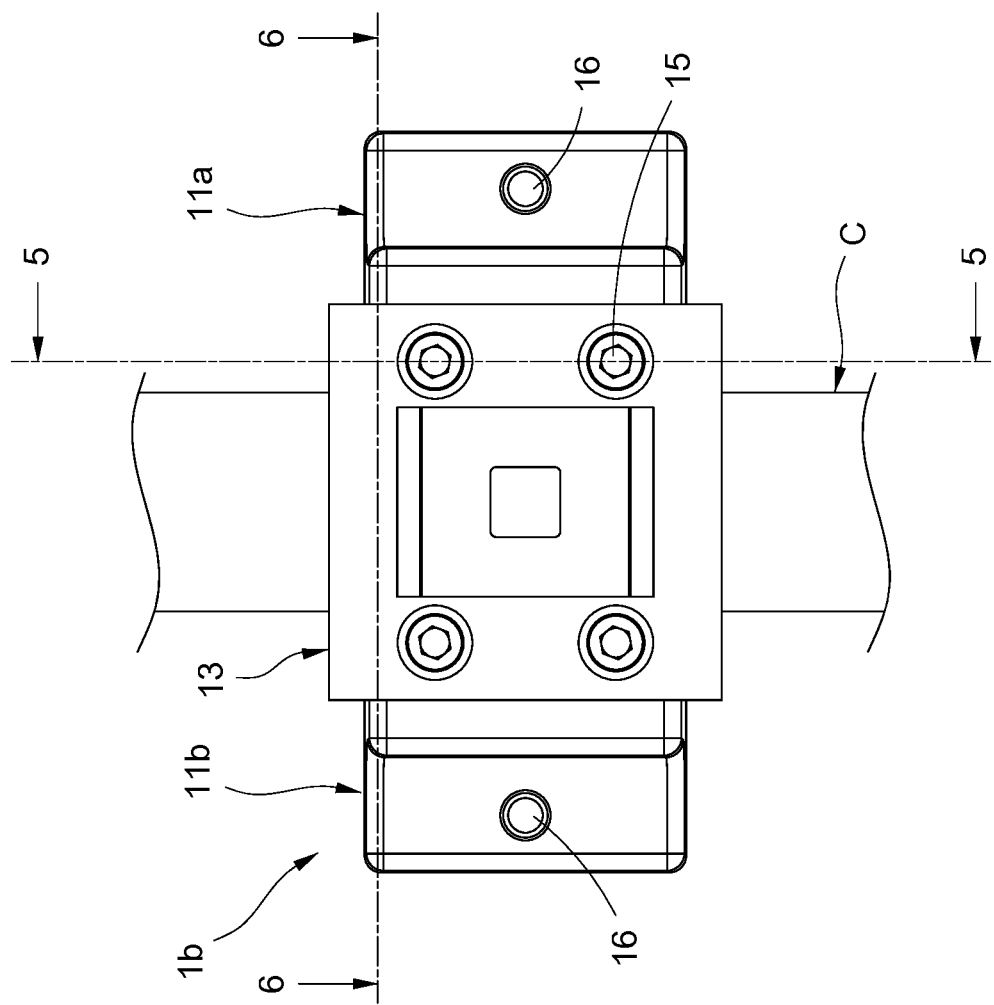
FIG. 4 is a schematic plan view of the adjustable gripper of the disclosure after gripping a rod.
Figure 5:
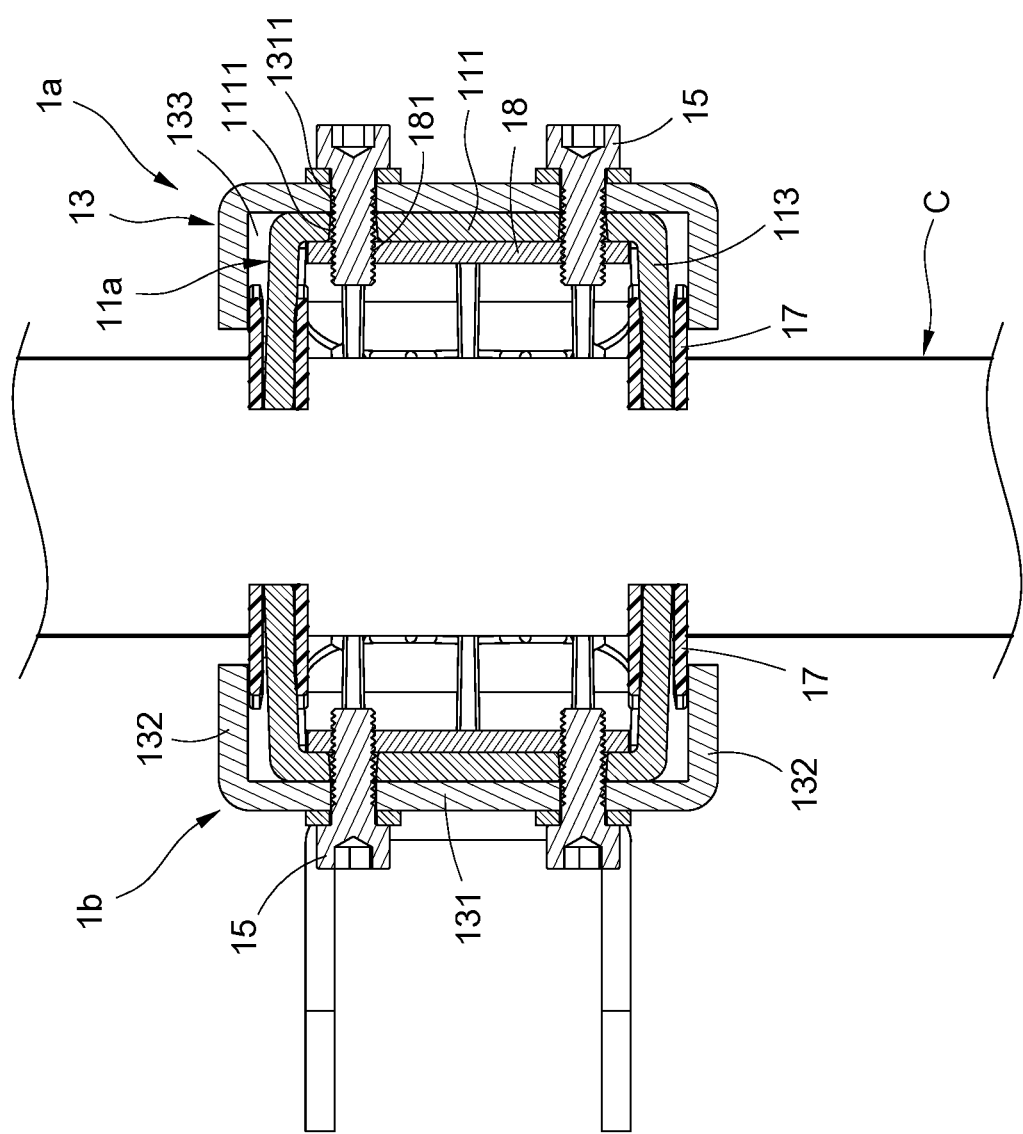
FIG. 5 is a cross-sectional view along line 5-5 in FIG. 4.

As a result, as shown in FIGS. 4-6, a user may adjust the distance between the first gripping block 11a and the second gripping block 11b of the adjusting assemblies 1a, 1b to fit the length size of the rod C. After finishing the adjustment of the length size, the adjusted length size is fixed by screwing each first adjusting screw 15.

Next, as shown in FIGS. 1, 5 and 6, the first gripping assembly 1a grips a corresponding side of the rod C with its gripping recess G, and the second gripping assembly 1b grips another corresponding side of the rod C with its gripping recess G. In other words, the two gripping assemblies 1a, 1b jointly grip the rod C with their gripping recesses G, and the gripping notches 1134 of the four gripping blocks 11a, 11b are corresponding to four outer corners of the rod C as shown in FIG. 6.

Finally, as shown in FIG. 6, each second adjusting screw 16 passes through each second through hole 1122 of the first gripping assembly 1a to be screwed to each second threaded hole 1123 of the second gripping assembly 1b so as to adjust the distance between the gripping recess G of the first gripping assembly 1a and the gripping recess G of the second gripping assembly 1b to fit the width size of the rod C.

Therefore, the support frame of the disclosure indeed utilizes the gripping adjustment function of the adjustable gripper 100 to fit a rod C with any size, and the gripping stability is increased to avoid loosening problem.

In other embodiments that are not depicted, each second threaded hole 1123 of the second gripping assembly 1b may be changed to the second through hole 1122 as long as a nut is added, so that the second stair 112 of the first gripping assembly 1a and the second stair 112 of the second gripping assembly 1b are tightened by the head portion of the second adjusting screw 16 and the nut.

As shown in FIGS. 2, 3, 5 and 6, at least one bushing 17 may be placed on the surrounding plate 113 at the positions of each gripping block 11a, 11b corresponding to each gripping notch 1134 to further improve the gripping stability to the rod C. It is noted that the reference character 1134 marked in FIG. 2 is the gripping notch 1134 added with the bushing 17, and the reference character 1134 marked in FIG. 3 is the gripping notch 1134 without adding with the bushing 17.

It is noted that an end of the support arm assembly 700 is bendably connected to the seat 13 of the second gripping assembly 1b.

While this disclosure has been described by means of specific embodiments, numerous modifications and variations could be made thereto by those skilled in the art without departing from the scope and spirit of this disclosure set forth in the claims.

What is claimed is:

1. A support frame for gripping a rod, the support frame comprising:
    an adjustable gripper, comprising a pair of gripping assemblies gripping the rod, and each gripping assembly comprising:
    a seat, comprising multiple first through holes;
    a pair of gripping blocks, slidably connected to the seat, each gripping block comprising a hole body and a gripping notch, and each gripping block comprising a long trough corresponding to the first through hole;
    a pair of connecting members, separately disposed on the pair of gripping blocks, and each connecting member comprising a first threaded hole corresponding to the first through hole;
    a pair of first adjusting screws, each first adjusting screw passing through both the first through hole and the long trough to screw to the first threaded hole, and each gripping assembly comprising a gripping recess defined between the gripping notches of the pair of gripping blocks; and
    a pair of second adjusting screws;
    wherein the pair of gripping assemblies jointly grips the rod by the gripping recess, and each second adjusting screw passes through the hole body of one of the gripping assemblies to screw to the hole body of another one of the gripping assemblies.

2. The support frame of claim 1, wherein the pair of gripping assemblies comprises a first gripping assembly and a second gripping assembly, the hole body of the first gripping assembly is a second through hole, and the hole body of the second gripping assembly is a second threaded hole.

3. The support frame of claim 1, wherein the seat of each gripping assembly comprises a seat plate and two wall plates, the seat plate comprises the multiple first through holes and two edges opposite to each other, the two wall plates are upright connected to the two edges of the seat plate, a sliding trench is disposed between the seat plate and the two wall plates, and the pair of gripping blocks are slidably connected in the sliding trench.

4. The support frame of claim 1, wherein each gripping block comprises at least one bushing disposed at the gripping notch.

5. The support frame of claim 1, wherein each gripping block comprises a first stair and a second stair connected to each other in a step manner, the first stair comprises the long trough, and the second stair comprises the hole body.

6. The support frame of claim 5, wherein each gripping block comprises a surrounding plate surrounding and connected with the first stair and the second stair, the surrounding plate comprises the gripping notch, and each gripping block comprises at least one bushing disposed on the surrounding plate corresponding to the gripping notch.

7. The support frame of claim 1, wherein the seat comprises a seat plate, each gripping block comprises a first stair, and the first stair of each gripping block is gripped between the seat plate and each connecting member.

8. The support frame of claim 7, wherein the long trough is disposed on the first stair of the gripping block, and the multiple first through holes are defined on the seat plate of the seat.

9. The support frame of claim 1, further comprising a support arm assembly, wherein the support arm assembly comprises multiple support arms bendably connected with each other, and one end of the support arm assembly is bendably connected to the seat of one of the gripping assemblies.

10. The support frame of claim 9, further comprising a carrier plate, wherein another end of the support arm assembly is bendably connected to the carrier plate.

11. The support frame of claim 1, wherein each gripping notch of each gripping assembly separately is corresponding to four outer corners of the rod.

\* \* \* \* \*